(12) United States Patent
Takahashi

(10) Patent No.: US 9,008,412 B2
(45) Date of Patent: Apr. 14, 2015

(54) IMAGE PROCESSING DEVICE, IMAGE PROCESSING METHOD AND RECORDING MEDIUM FOR COMBINING IMAGE DATA USING DEPTH AND COLOR INFORMATION

(75) Inventor: Kosei Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 515 days.

(21) Appl. No.: 13/409,045

(22) Filed: Feb. 29, 2012

(65) Prior Publication Data

US 2012/0230549 A1 Sep. 13, 2012

(30) Foreign Application Priority Data

Mar. 8, 2011 (JP) ................. 2011-050092

(51) Int. Cl.
| | |
|---|---|
| G06K 9/00 | (2006.01) |
| G06T 15/50 | (2011.01) |
| H04N 13/00 | (2006.01) |
| H04N 13/02 | (2006.01) |
| H04N 5/247 | (2006.01) |

(52) U.S. Cl.
CPC .......... *G06T 15/503* (2013.01); *H04N 13/0011* (2013.01); *H04N 13/0037* (2013.01); *H04N 13/0242* (2013.01); *H04N 13/025* (2013.01); *H04N 13/0257* (2013.01); *H04N 2013/0077* (2013.01); *H04N 2013/0081* (2013.01); *G06T 2200/21* (2013.01); *H04N 5/247* (2013.01)

(58) Field of Classification Search
None
See application file for complete search history.

(56) References Cited

U.S. PATENT DOCUMENTS

| | | | |
|---|---|---|---|
| 6,987,567 B2 | 1/2006 | Takahashi et al. | |
| 7,433,102 B2 | 10/2008 | Takahashi et al. | |
| 7,443,536 B2 | 10/2008 | Takahashi | |
| 7,616,361 B2 | 11/2009 | Takahashi | |
| 7,667,845 B2 | 2/2010 | Takahashi et al. | |

(Continued)

FOREIGN PATENT DOCUMENTS

| | | |
|---|---|---|
| JP | 2005-051318 | 2/2005 |
| JP | 2008-128771 | 6/2008 |

OTHER PUBLICATIONS

"Denkowski" et al. 'Estimating 3D Surface Depth Based on Depth-of-Field Image Fusion' in: Intech, 'Image Fusion' (Jan. 12, 2011), Chapter 5, pp. 89-104].*

(Continued)

*Primary Examiner* — Matthew Bella
*Assistant Examiner* — Jason Heidemann
(74) *Attorney, Agent, or Firm* — Fitzpatrick, Cella, Harper & Scinto

(57) ABSTRACT

To enhance the accuracy of the search of a corresponding point in a plurality of sheets of images photographed by a camera array and to acquire more pieces of color information on a subject. First color information is calculated from pixel values of the plurality of pieces of photographed image data photographed by the camera array, and the first color information is used to calculate a corresponding point between images indicated by the plurality of pieces of photographed image data. The calculated corresponding point is used to calculate information on the depth of the subject in the image indicated by the photographed image data. Second color information that is used for reproducing the color of the subject faithfully is calculated from the pixel values of the plurality of pieces of photographed image data. The calculated depth information and second color information are used to combine the plurality of photographed images.

8 Claims, 14 Drawing Sheets

(56) References Cited

U.S. PATENT DOCUMENTS

| | | | |
|---|---|---|---|
| 2002/0173723 A1* | 11/2002 | Lewis et al. | 600/473 |
| 2007/0229653 A1* | 10/2007 | Matusik et al. | 348/51 |
| 2010/0214617 A1 | 8/2010 | Edamura et al. | |
| 2012/0188389 A1* | 7/2012 | Lin et al. | 348/218.1 |

OTHER PUBLICATIONS

English language machine translation of Japanese Publication No. JP 2008-128771 A, dated Jun. 5, 2008, translated on Aug. 11, 2014, pp. 1-8.*

* cited by examiner

| f_A1 | f_A2 | f_A1 | f_A2 |
|------|------|------|------|
| f_A2 | f_A3 | f_A2 | f_A3 |
| f_A1 | f_A2 | f_A1 | f_A2 |
| f_A2 | f_A3 | f_A2 | f_A3 |

FIG.4A

| f_B1 | f_B2 | f_B1 | f_B2 |
|------|------|------|------|
| f_B2 | f_B3 | f_B2 | f_B3 |
| f_B1 | f_B2 | f_B1 | f_B2 |
| f_B2 | f_B3 | f_B2 | f_B3 |

FIG.4B

| COMPOSITION CONDITION SETTING WINDOW | | | | | | |
|---|---|---|---|---|---|---|
| VIEWPOINT POSITION | X | xxx | Y | xxx | Z | xxx |
| LINE-OF-SIGHT DIRECTION | θ | xxx | φ | xxx | | |

| | |
|---|---|
| FOCAL DISTANCE | xxx mm |
| APERTURE VALUE (F VALUE) | xxx |
| ILLUMINATION LIGHT SOURCE | D50 |

COMPOSITION PROCESSING

FIG.9

| RED | GREEN | BLUE |
|---|---|---|
| R(0,0) | G(0,0) | B(0,0) |
| R(1,0) | G(1,0) | B(1,0) |
| ... | ... | ... |
| R(M,0) | G(M,0) | B(M,0) |
| ... | ... | ... |
| R(M,N) | G(M,N) | B(M,N) |

FIG.14A

| DISTANCE | $R_{380}$ | $R_{390}$ | ... | $R_{780}$ |
|---|---|---|---|---|
| D(0,0) | $R_{380}(0,0)$ | $R_{390}(0,0)$ | ... | $R_{780}(0,0)$ |
| D(1,0) | $R_{380}(1,0)$ | $R_{390}(1,0)$ | ... | $R_{780}(1,0)$ |
| ... | ... | ... | ... | ... |
| D(M,0) | $R_{380}(M,0)$ | $R_{390}(M,0)$ | ... | $R_{780}(M,0)$ |
| ... | ... | ... | ... | ... |
| D(M,N) | $R_{380}(M,N)$ | $R_{390}(M,N)$ | ... | $R_{780}(M,N)$ |

FIG.14B

IMAGE PROCESSING DEVICE, IMAGE PROCESSING METHOD AND RECORDING MEDIUM FOR COMBINING IMAGE DATA USING DEPTH AND COLOR INFORMATION

BACKGROUND OF THE INVENTION

1. Field of the Invention

The present invention relates to a camera array (as known as camera array system, multiple lens camera, and the like) that performs photographing with a plurality of cameras arranged.

2. Description of the Related Art

In recent years, a technology has been developed that uses the so-called camera array where a plurality of imaging devices such as digital cameras is arranged. By performing photographing with a camera array to acquire three-dimensional information on a subject, it is possible to generate image data indicating an image of an arbitrary viewpoint or a line-of-sight direction and to generate image data indicating a parallax image for the display of a three-dimensional image. It is also possible to generate image data indicating an image in which, after photographing, a focus position and a depth of field have been changed.

There is a technology for acquiring more pieces of subject information by performing photographing with the camera array described above while changing not only the position of each camera and the direction of an optical axis but also photographing conditions.

For example, Japanese Patent Laid-Open No. 2005-51318 discloses a method of performing photographing while changing the focus position and the exposure of each camera.

Japanese Patent Laid-Open No. 2008-128771 discloses a method of performing photographing with an optical filter having a different spectral transmission characteristic attached to each camera and thereby acquiring spectral information on a subject.

However, in the technology disclosed in Japanese Patent Laid-Open No. 2005-51318, the acquired color information is the same in all cameras (for example, RGB values). Hence, when a plurality of sheets of images is combined, many pieces of redundant data are wastefully and disadvantageously contained.

In the technology disclosed in Japanese Patent Laid-Open No. 2008-128771, the color information on the image photographed by each camera is acquired through the color filter having a different characteristic. Hence, even when the same subject is photographed, the pixel value of the image data differs from camera to camera, and thus the accuracy of the calculation of a corresponding point between the cameras is disadvantageously reduced.

SUMMARY OF THE INVENTION

An object of the present invention is to provide an image processing device, an image processing method and a recording medium that enhance the accuracy of the search of a corresponding point between images indicated by data on a plurality of sheets of images photographed by a camera array and that can acquire more pieces of color information on a subject.

According to the present invention, there is provided an image processing device that performs processing on a plurality of pieces of photographed image data photographed by a camera array in which cameras mounting any of two or more types of filter set are arranged in an array, the image processing device comprising: a first color information calculation unit configured to calculate, from pixel values of the plurality of pieces of photographed image data, first color information that is color information in a common color space; a distance information calculation unit configured to calculate a corresponding point between images indicated by the plurality of pieces of photographed image data by using the calculated first color information, to thereby calculate information on a depth of a subject in the image indicated by the photographed image data; a second color information calculation unit configured to calculate, from the pixel values of the plurality of pieces of photographed image data, second color information that is color information used for reproducing a color of the subject; and a composition unit configured to combine the plurality of pieces of photographed image data by using the calculated depth information and second color information.

According to the present invention, it is possible to provide an image processing device, an image processing method and a recording medium that enhance the accuracy of the search of a corresponding point between images indicated by data on a plurality of sheets of images photographed by a camera array and that can acquire more pieces of information on a subject.

Further features of the present invention will become apparent from the following description of exemplary embodiments (with reference to the attached drawings).

BRIEF DESCRIPTION OF THE DRAWINGS

FIGS. 4A and 4B are diagrams showing an example of the arrangement of pixels of the color filter in the embodiment;

FIG. 9 is a diagram showing an example of UI for setting composition conditions in the first example;

FIGS. 14A and 14B are diagrams showing an example of an image data format in the second example.

DESCRIPTION OF THE EMBODIMENTS

A preferred embodiment of the present invention will be described in detail below with reference to accompanying drawings. Constituent elements described in the embodiment are only illustrative, and are not intended to limit the scope of the invention.

First Example

Figure 1:
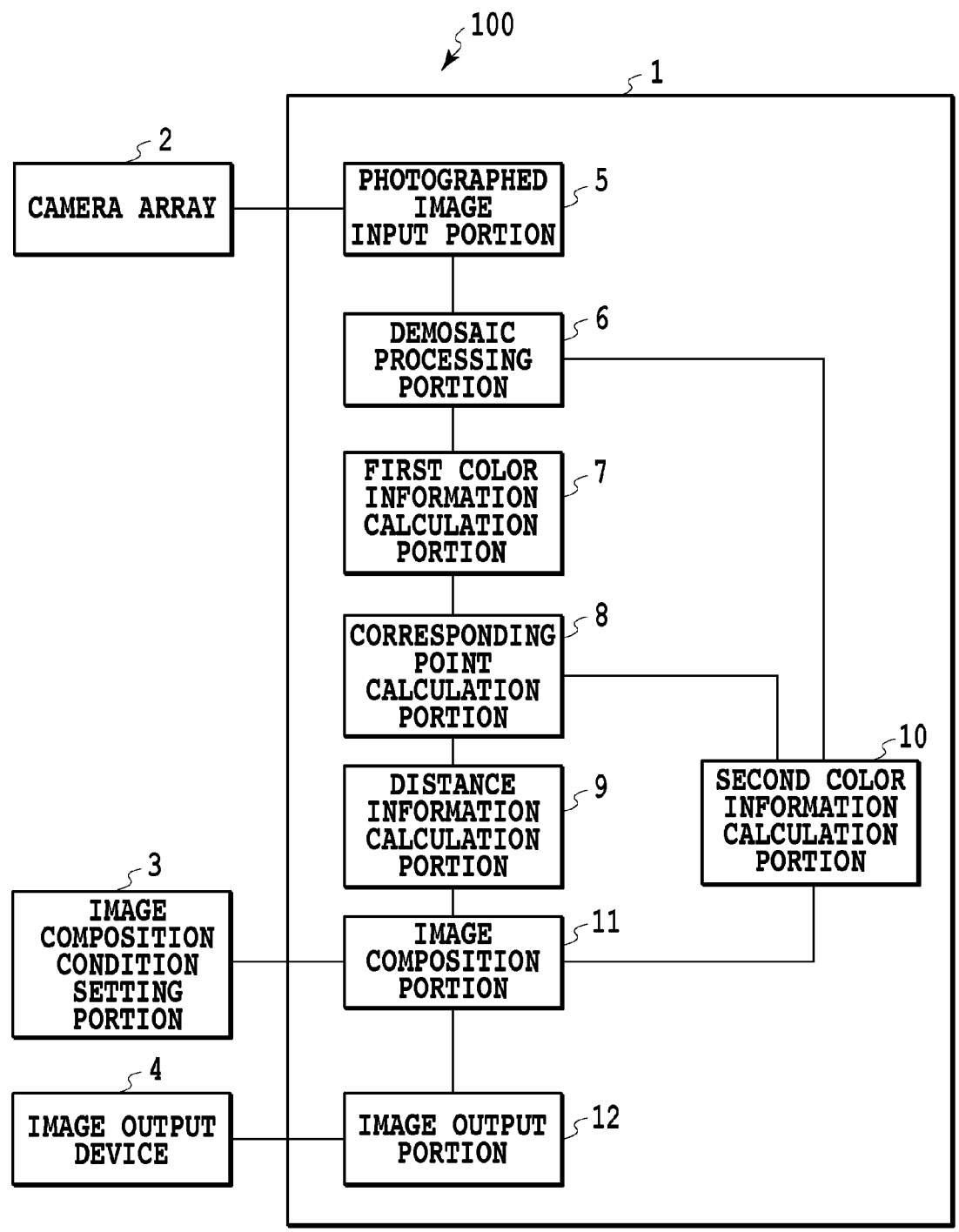
FIG. 1 is a block diagram showing the configuration of an image processing device of a first example.

The configuration of an image processing device according to the present embodiment will be described with reference to a block diagram shown in FIG. 1. Reference numeral 1 represents the image processing device for combining images indicated by data on a plurality of sheets of images photographed by a camera array. Reference numeral 2 represents the camera array in which image acquisition devices such as a plurality of digital cameras are arranged in an array. Reference numeral 3 represents an image composition condition setting portion for setting conditions when images indicated by data on a plurality of images photographed by the camera array 2. Reference numeral 4 represents an image output device such as a display for displaying an image.

Reference numeral 5 represents a photographed image input portion for reading, in the image processing device 1, the image data photographed by the camera array 2. Reference numeral 6 represents a demosaic processing portion for performing demosaic processing on the image data input by the photographed image input portion 5. Reference numeral 7 represents a first color information calculation portion for calculating first color information (in the present example, assumed to be a brightness value) used for the calculation of a corresponding point described later, using the photographed image data on which the demosaic processing has been performed by the demosaic processing portion 6. Reference numeral 8 represents a corresponding point calculation portion for calculating the corresponding point between images indicated by the photographed image data, using the first color information on each pixel calculated by the first color information calculation portion 7. Reference numeral 9 represents a distance information calculation portion for calculating distance information (information on the depth of the subject) on the subject, using the corresponding point information calculated by the corresponding point calculation portion 8. Reference numeral 10 represents a second color information calculation portion for calculating second color information (in the present example, assumed to be a spectral reflectance) on the subject, using the photographed image data on which the demosaic processing has been performed by the demosaic processing portion 6 and the corresponding point information calculated by the corresponding point calculation portion 8. The second color information is color information faithful to the subject, and is information that is used for reproducing the colors of the subject faithfully. Reference numeral 11 represents an image composition portion for generating a composition image for output, using the image composition conditions set by the image composition condition setting portion 3, the distance information calculated by the distance information calculation portion 9 and the second color information calculated by the second color information calculation portion 10. Reference numeral 12 represents an image output portion that outputs the composition image generating by the image composition portion 11 so as to display it on the image output device 4.

Reference numeral 100 represents a camera array system configured as described above. The camera array 2 and the image output device 4 can be disconnected from the image processing device 1.

Although, in the present example, the first color information is assumed to be the brightness value, and that the second color information is assumed to be the spectral reflectance, the present invention is not limited to this assumption. The first color information may be, for example, a Lab value or a sRGB (standard RGB) value; the first color information is preferably information that is obtained by converting pixel values of a plurality of pieces of image data into color information in a common color space. The second color information may be, for example, other spectral information such as a spectral radiation brightness; the second color information is preferably information for reproducing the colors of the subjects faithfully that cannot be expressed by only RGB and the like.

Figure 2:
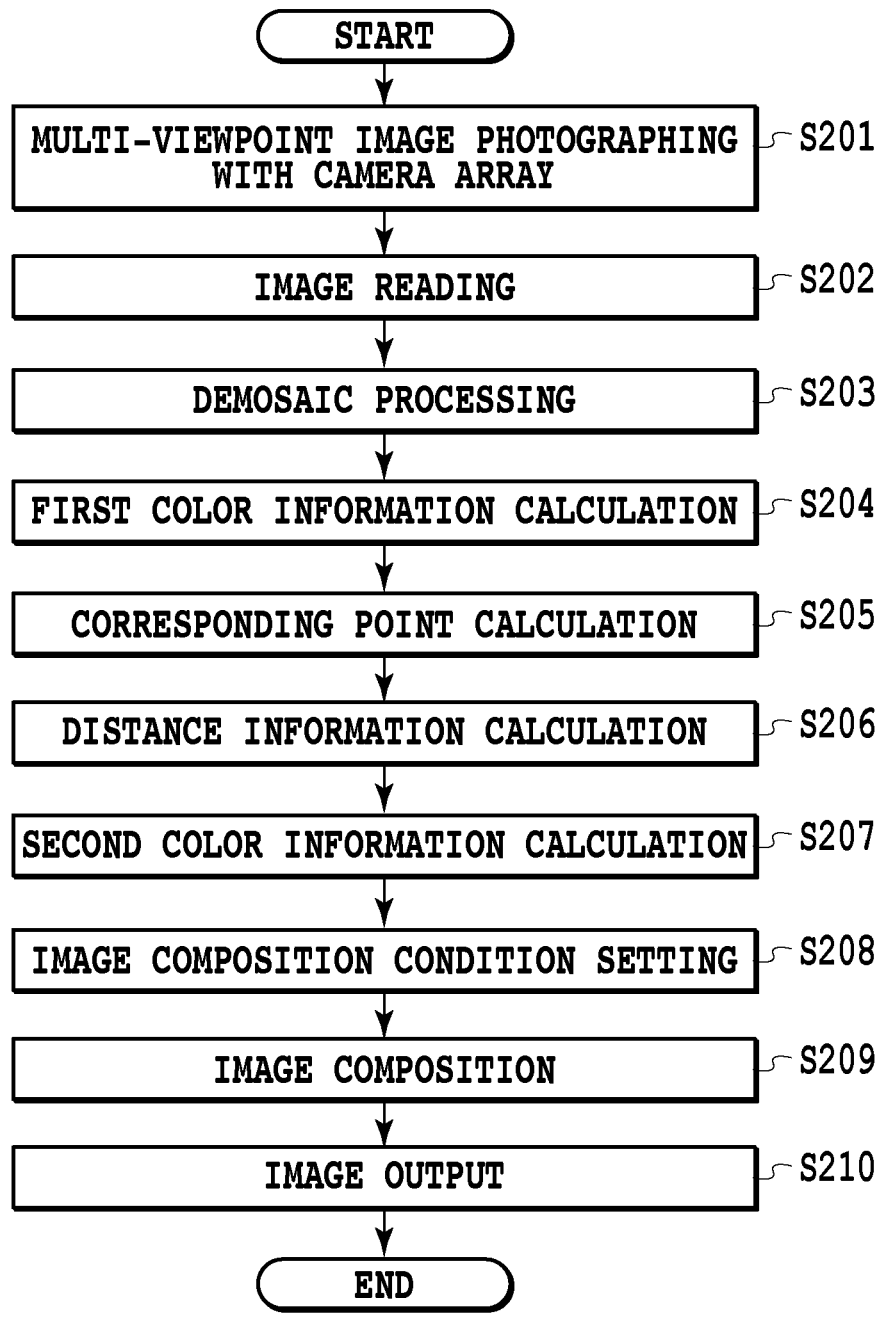
FIG. 2 is a flowchart showing processing performed by the image processing device of the first example.

FIG. 2 is a flowchart showing the image processing performed by the camera array system 100. In S201, the subject to be photographed is first photographed by the camera array 2 from a plurality of viewpoints.

In S202, the photographed image input portion 5 reads, in the image processing device 1, a plurality of pieces of photographed image data photographed in S201. In S203, the demosaic processing portion 6 performs the demosaic processing on the plurality of pieces of photographed image data read in S202. In S204, the first color information calculation portion 7 calculates the brightness value that is the first color information on each pixel of the image data on which the demosaic processing has been performed in S203 (details of which will be described later). In S205, the corresponding point calculation portion 8 uses the brightness signal calculated in S204, and thereby calculates the corresponding point between the images indicated by the plurality of pieces of image data (details of which will be described later). In S206, the distance information calculation portion 9 uses the corresponding point information calculated in S205, and thereby calculates the distance information on each pixel (details of which will be described later). In S207, the second color information calculation portion 10 calculates the spectral reflectance that is the second color information, on each pixel of the pixel data on which the demosaic processing has been performed in S203, using the corresponding point information calculated in S205 (details of which will be described later).

In S208, the image composition condition setting portion 3 sets conditions for the composition of a plurality of photographed images read in S202 according to an instruction from a user or a command from an external device.

In S209, the image composition portion 11 performs image composition, using the distance information calculated in S206 and the second color information calculated in S207, based on the composition conditions set in S208 (details of which will be described later). In S210, the image output portion 12 outputs the composition image combined in S209 to the image output device 4.

<Configuration of the Color Filter of the Camera Array>

Figure 3A:
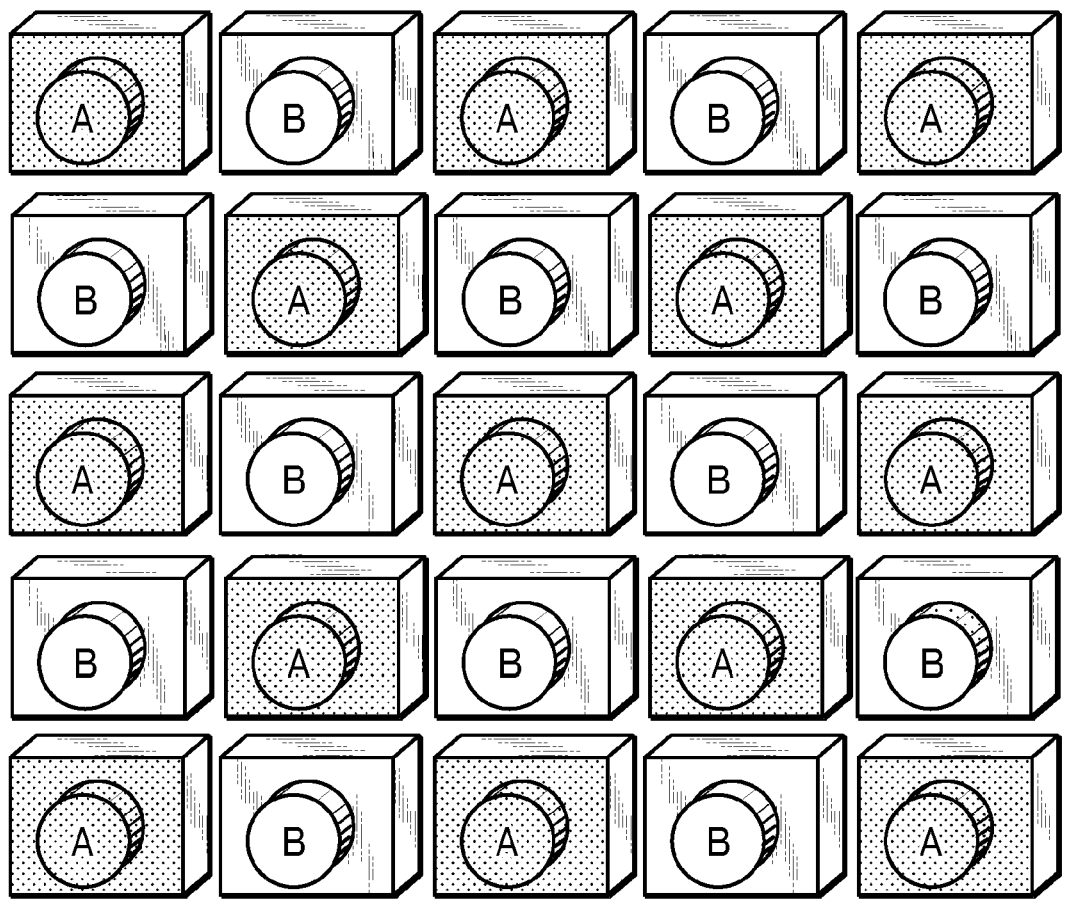
FIGS. 3A and 3B are diagrams showing an example of the configuration of a color filter of a camera array in an embodiment.
Figure 3B:
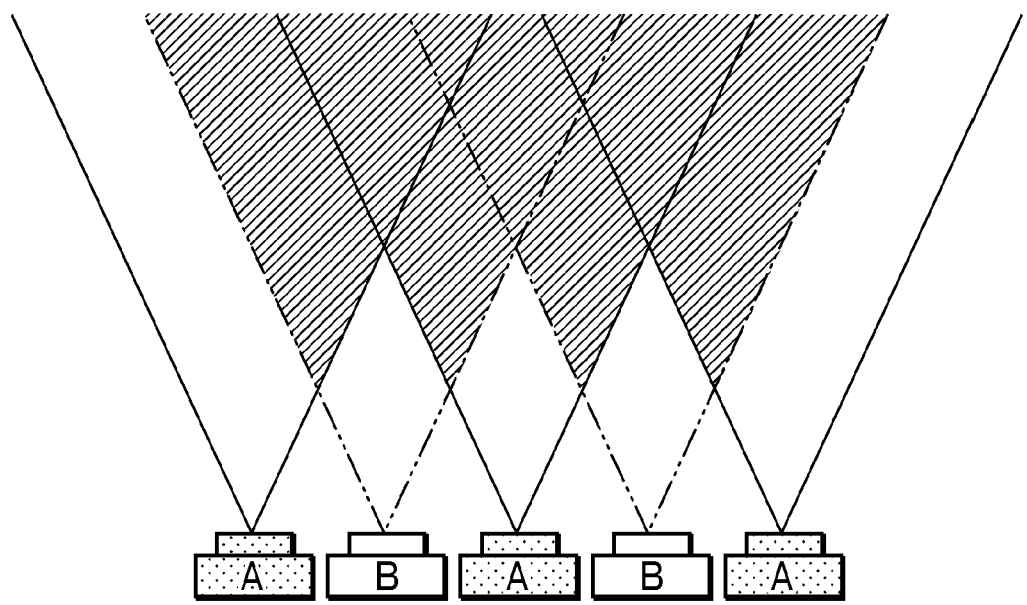
Figure 5A:
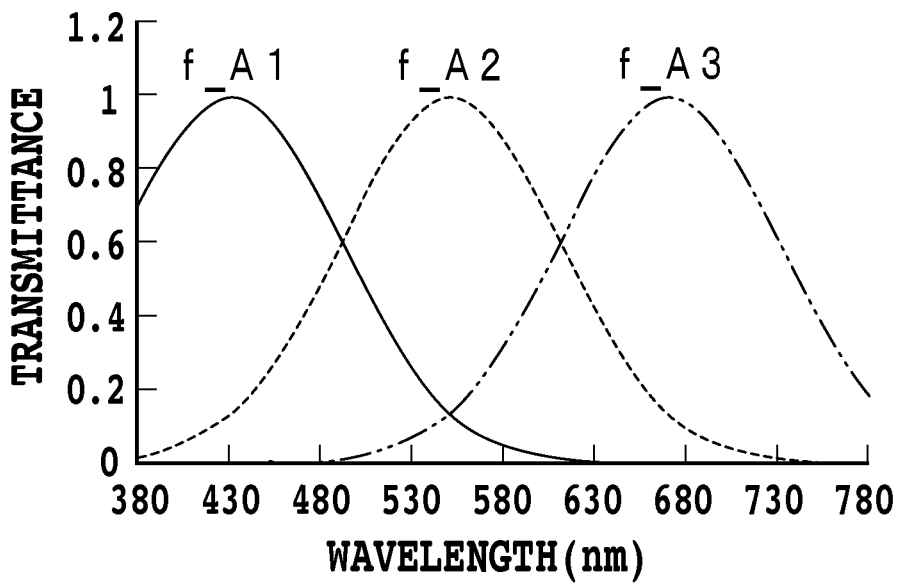
FIGS. 5A and 5B are graphs showing an example of the spectral transmittance of the color filter in the embodiment.
Figure 5B:
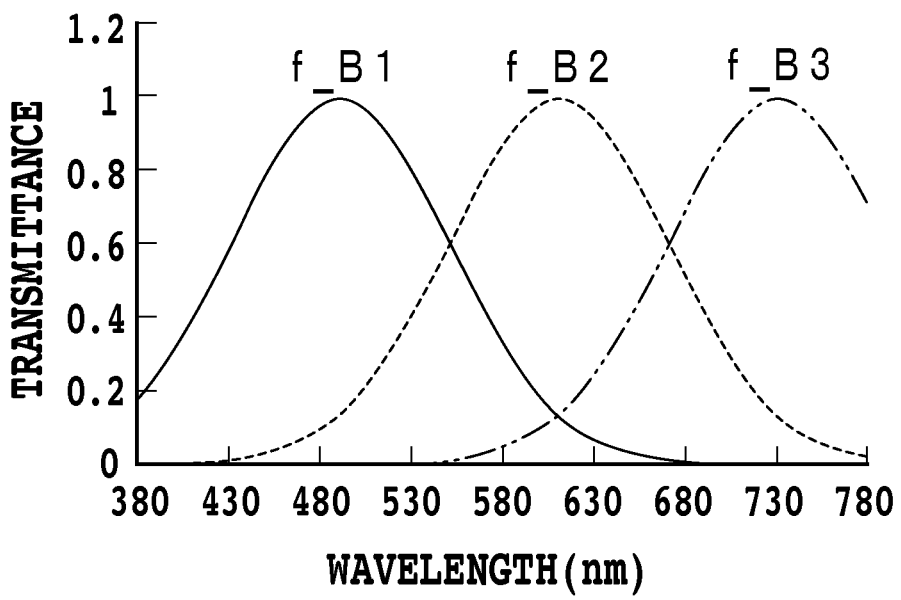

FIGS. 3A and 3B show the configuration of a color filter of the camera array 2 in an embodiment. FIG. 3A illustrates an example of the configuration of the camera array 2 where a total of 25 (5×5) monocular cameras are arranged. In FIG. 3A, monocular cameras mounting filter sets A and monocular cameras mounting filter sets B are arranged in a checkered pattern. In other words, the monocular cameras mounting the filter sets A and the monocular cameras mounting the filter sets B are arranged alternately. The monocular cameras are arranged in this way, and thus when photographed images photographed by the monocular cameras are combined, it is possible to reduce an unnecessary action of combining redundant data.

Here, for example, in the transmission characteristic of the filter set A, a three-color color filter (f_A1, f_A2 and f_A3) shown in FIG. 4A is used, and in the transmission characteristic of the filter set B, a three-color color filter (f_B1, f_B2 and f_B3) shown in FIG. 4B is used. In FIGS. 4A and 4B, the angle of view of the cameras mounting the filter sets A and the angle of view of the cameras mounting the filter sets B overlap each other according to the angle of view of each of the monocular cameras and the distance between the monocular cameras. A region indicated by oblique lines in FIG. 3B illustrates an example of the region where the angles of view of the cameras overlap each other in the subject. Since the angles of view overlap each other in this way, it is possible to acquire information on the color filters of six colors.

In the present example, the six-color color filter is divided into two sets of color filters, each set having three colors. Each of the monocular cameras mounts any of these color filters, and performs photographing in a multi-band. Hence, it is possible to perform photographing with a high resolution as compared with a case where all cameras mount six-color color filters.

Although, in the present example, the number of types of filter set is two, the present invention is not limited to this example. Each of the monocular cameras may mount any of three or more types (that is, two or more types) of filter sets.

<Calculation of a Brightness Signal>

Here, the processing for calculating a brightness signal will be described in detail as the processing for calculating the first color information in S204.

In the present example, it is possible to individually calculate a brightness signal (Y value) from photographed image data photographed by the monocular cameras of the camera array 2. For example, consider a case where photographing is performed with one monocular camera using the three-color filter (f_A1, f_A2 and f_A3) shown in FIG. 4A. Here, the brightness value Y (i, j)$_A$ of a pixel at coordinates (i, j) in the image indicated by the image data is calculated by the following formula using a pixel value ($V_{A1}$, $V_{A2}$, $V_{A3}$) after the demosaic processing is performed.

[Formula 1]

$$Y(i, j)_A = (\alpha_{A1} \cdot V_{g\_A1}) + (\alpha_{A2} \cdot V_{g\_A2}) + (\alpha_{A3} \cdot V_{g\_A3}) \quad (1)$$

$$\begin{cases} V_{g\_A1} = V_{A1}^{\gamma_{A1}} \\ V_{g\_A2} = V_{A2}^{\gamma_{A2}} \\ V_{g\_A3} = V_{A3}^{\gamma_{A3}} \end{cases}$$

As coefficients ($\alpha_{A1}$, $\alpha_{A2}$, $\alpha_{A3}$, $\gamma_{A1}$, $\gamma_{A2}$, $\gamma_{A3}$) in formula (1), values are used that are obtained by using and optimizing pixel values when a subject having known brightness is photographed. Likewise, the brightness value Y (i, j)$_B$ of the image data photographed with the three-color color filter (f_B1, f_B2 and f_B3) shown in FIG. 4B is calculated by the following formula using a pixel value ($V_{A1}$, $V_{A2}$, $V_{A3}$) after the demosaic processing is performed.

[Formula 2]

$$Y(i, j)_B = (\alpha_{B1} \cdot V_{g\_B1}) + (\alpha_{B2} \cdot V_{g\_B2}) + (\alpha_{B3} \cdot V_{g\_B3}) \quad (2)$$

$$\begin{cases} V_{g\_B1} = V_{B1}^{\gamma_{B1}} \\ V_{g\_B2} = V_{B2}^{\gamma_{B2}} \\ V_{g\_B3} = V_{B3}^{\gamma_{B3}} \end{cases}$$

As coefficients ($\alpha_{B1}$, $\alpha_{B2}$, $\alpha_{B3}$, $\gamma_{B1}$, $\gamma_{B2}$, $\gamma_{B3}$) in formula (2), values are used that are obtained by using and optimizing pixel values when a subject having known brightness is photographed.

Here, the same subject used for the optimization is used both in the filter set A and in the filter set B, and thus it is possible to calculate the same brightness value on the subject of the same brightness, with the result that the accuracy of the search of the corresponding point, which will be described later, is enhanced.

The method for converting the pixel value into the brightness Value is not limited to the linear conversion such as formulas (1) and (2); for example, conversion in which the nonlinearity of a sensor output is corrected using a second-order term as in formulas (3) and (4) below may be performed.

[Formula 3]

$$Y(i, j)_A = (\alpha_{A1} \cdot V_{g\_A1}^2) + (\alpha_{A2} \cdot V_{g\_A2}^2) + (\alpha_{A3} \cdot V_{g\_A3}^2) + (\alpha_{A4} \cdot V_{g\_A1}) + \quad (3)$$
$$(\alpha_{A5} \cdot V_{g\_A2}) + (\alpha_{A6} \cdot V_{g\_A3}) + (\alpha_{A7} \cdot V_{g\_A1} \cdot V_{g\_A2}) +$$
$$(\alpha_{A8} \cdot V_{g\_A2} \cdot V_{g\_A3}) + (\alpha_{A9} \cdot V_{g\_A3} \cdot V_{g\_A1}) + \alpha_{A10}$$

$$\begin{cases} V_{g\_A1} = V_{A1}^{\gamma_{A1}} \\ V_{g\_A2} = V_{A2}^{\gamma_{A2}} \\ V_{g\_A3} = V_{A3}^{\gamma_{A3}} \end{cases}$$

[Formula 4]

$$Y(i, j)_B = (\alpha_{B1} \cdot V_{g\_B1}^2) + (\alpha_{B2} \cdot V_{g\_B2}^2) + (\alpha_{B3} \cdot V_{g\_B3}^2) + (\alpha_{B4} \cdot V_{g\_B1}) + \quad (4)$$
$$(\alpha_{B5} \cdot V_{g\_B2}) + (\alpha_{B6} \cdot V_{g\_B3}) + (\alpha_{B7} \cdot V_{g\_B1} \cdot V_{g\_B2}) +$$
$$(\alpha_{B8} \cdot V_{g\_B2} \cdot V_{g\_B3}) + (\alpha_{B9} \cdot V_{g\_B3} \cdot V_{g\_B1}) + \alpha_{B10}$$

$$\begin{cases} V_{g\_B1} = V_{B1}^{\gamma_{B1}} \\ V_{g\_B2} = V_{B2}^{\gamma_{B2}} \\ V_{g\_B3} = V_{B3}^{\gamma_{b3}} \end{cases}$$

Figure 7A:
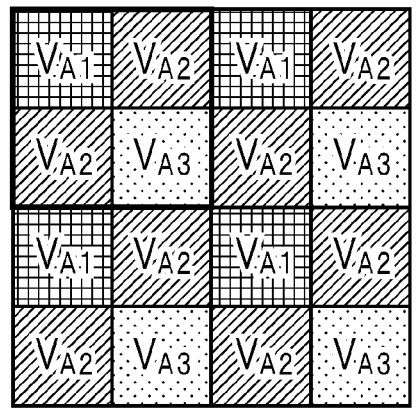
FIGS. 7A to 7C are diagrams illustrating the method of calculating first color information in the embodiment.
Figure 7B:
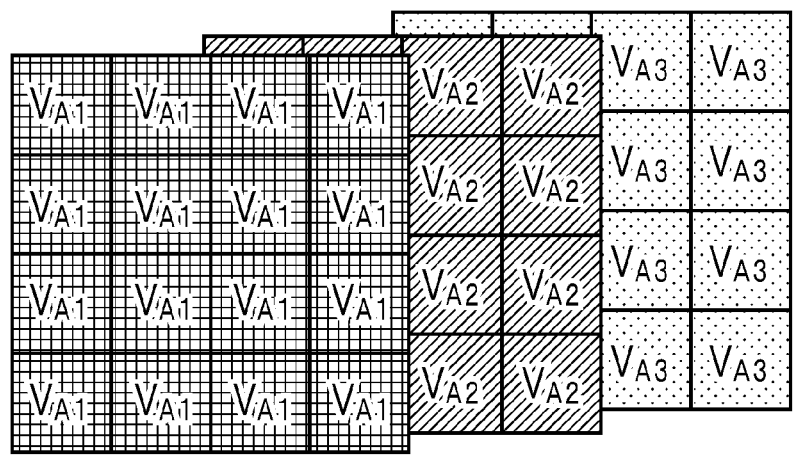
Figure 7C:
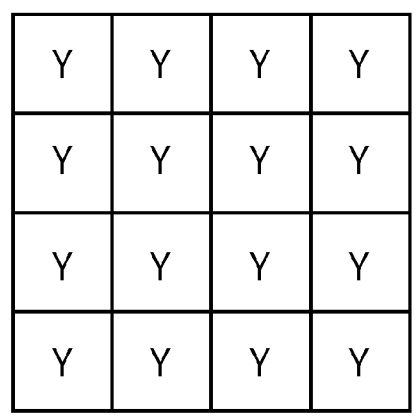

A relationship between the demosaic processing described above and brightness signal calculation processing will be described with reference to FIGS. 7A to 7C. In the image data photographed by the monocular cameras mounting the filter sets A, as shown in FIG. 7A, the pixel value ($V_{A1}$, $V_{A2}$, $V_{A3}$) corresponding to the three types of color filter (f_A1, f_A2 and f_A3) are arranged in a Bayer pattern. Here, the demosaic processing in S203 is performed, and thus three-band image data corresponding to the three types of color filter is generated by interpolation processing. Furthermore, the brightness calculation processing in S204 is performed, and thus the brightness value Y is calculated for each of the pixels. In the present example, the calculation of the corresponding point, which will be described later, is assumed to be processed using the brightness value of each of the pixels.

Even when the first color information is the Lab value or the sRGB, it is possible to calculate the first color information using a known method such as for calculating it from the pixel value using predetermined coefficients.

<Calculation of the Corresponding Point>

Here, the processing for calculating the corresponding point between a plurality of images will be described in detail. The corresponding point between the plurality of images is calculated using a difference of the first color information between the plurality of images.

Figure 6A:
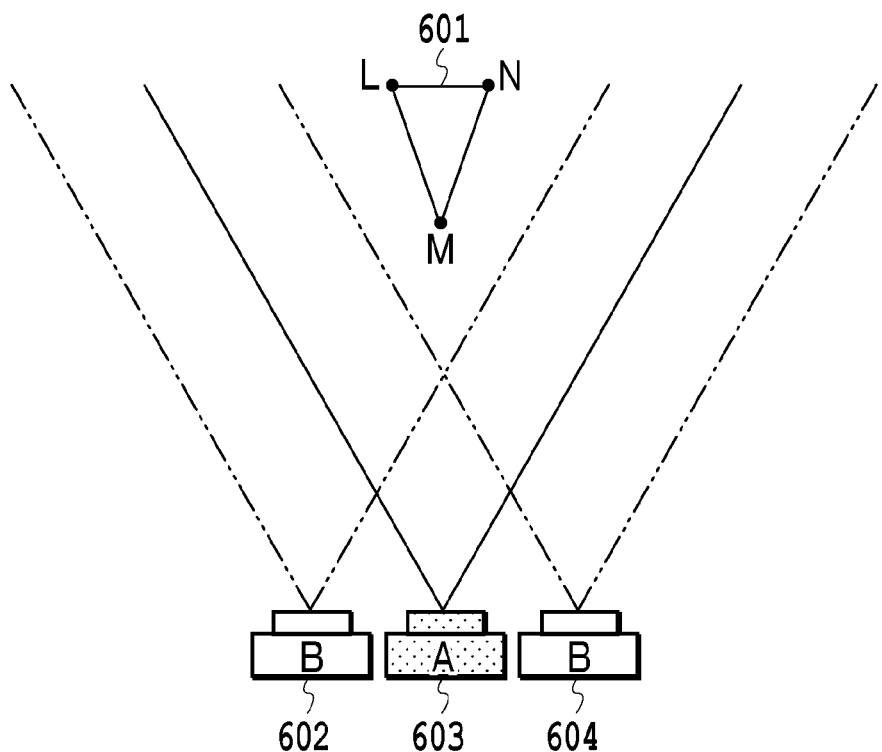
FIGS. 6A and 6B are diagrams illustrating corresponding point search processing in the embodiment.

FIG. 6A is a diagram showing a positional relationship between the subject and a plurality of cameras (camera array). Here, for ease of description, the number of cameras is assumed to be three. It is assumed that the camera 603 in the center mounts the filter set A (f_A1, f_A2 and f_A3) as the color filter, and the two cameras 602 and 604 on the left and right mount the filter set B (f_B1, f_B2 and f_B3) as the color filter.

Figure 6B:
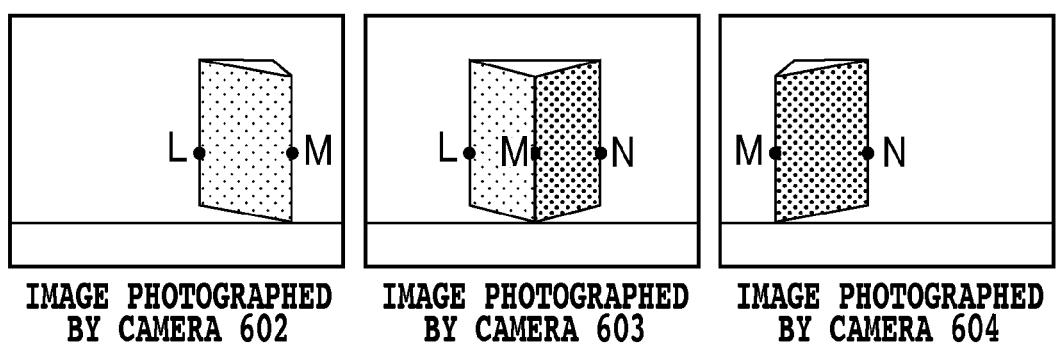

FIG. 6B shows image data obtained by photographing the subject 601 with the cameras 602, 603 and 604. Here, the camera 603 in the center photographs all points L, M and N on the subject. On the other hand, the camera 602 photographs the points L and M but does not photograph the point N due to occlusion. On the other hand, the camera 604 photographs the points M and N but does not photograph the point L. Then, the corresponding point is searched for, using the first color information, by a pattern matching such as a stereo matching method, with reference to the camera 603 in the center. In this case, the corresponding point for the point L is determined from the photographed image data of the camera 602, and the corresponding point for the point. N is determined from the photographed image data of the camera 604. Consequently, it is possible to calculate the corresponding points and thereby perform the reproduction of the color information and the distance information calculation processing, which will be described later, without being affected by so-called occlusion in which there is a portion that is photographed by a certain camera but is not photographed by another camera due to the shadow of another subject.

<Calculation of the Distance Information>

Figure 8A:
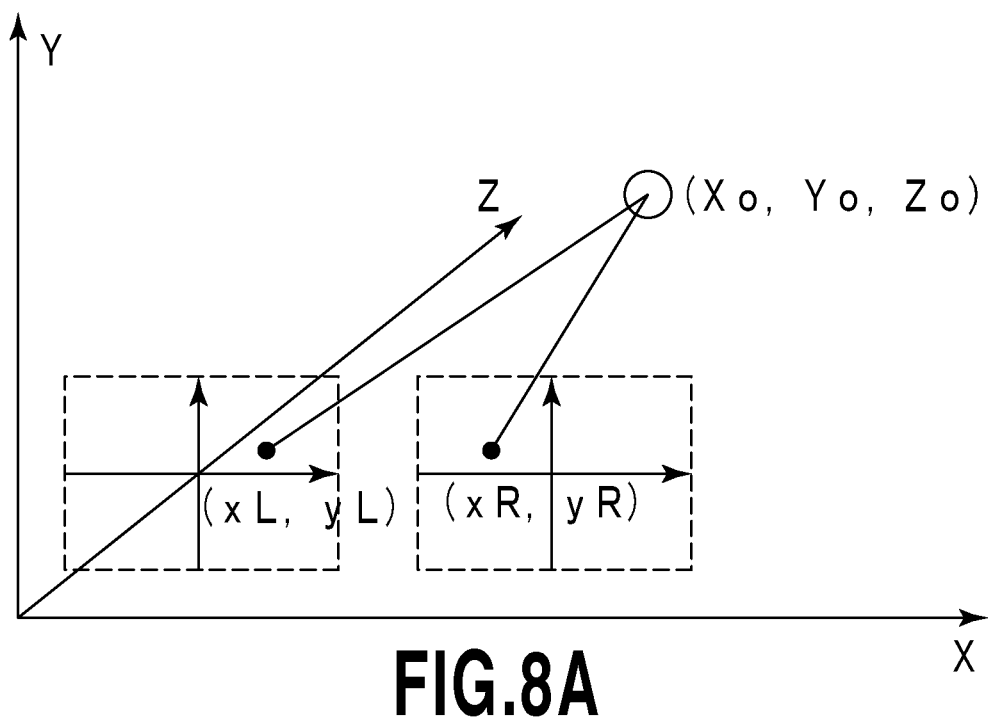
FIGS. 8A and 8B are diagrams illustrating the method of calculating distance information in the embodiment.
Figure 8B:
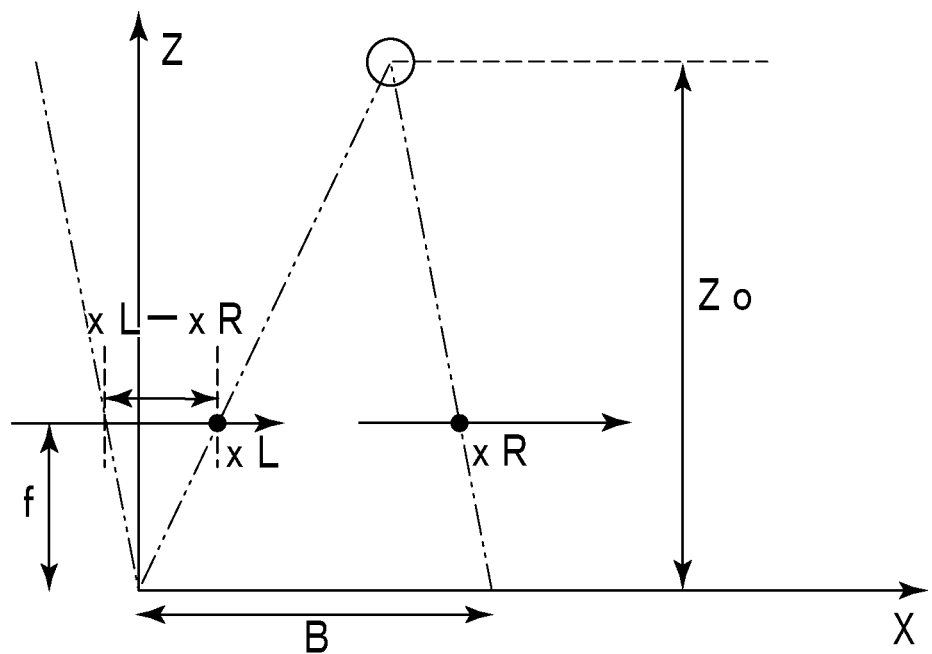

Here, the distance information calculation processing in S206 will be described in detail. Consider, as shown in FIG. 8A, a method of calculating the distance information from photographed data photographed by two cameras (camera 1 and camera 2). Here, a coordinate axis is set such that the optical axis of the camera 1 coincides with Z axis. It is assumed that the optical axes of the camera 1 and the camera 2 are parallel to each other and are arranged parallel to X axis. FIG. 8B is a diagram obtained by projecting FIG. 8A on X-Z plane. Coordinates at a certain point of the subject when the focus point of the camera 1 is defined as an origin in a three-dimensional space are assumed to be $(X_O, Y_O, Z_O)$. Coordinates at a point where the point of the subject forms an image indicated by the photographed image data of the camera 1 when the center of the image indicated by the photographed image data of the camera 1 is defined as an origin are assumed to be $(x_L, y_L)$. Furthermore, coordinates at a point where this point (corresponding point) of the subject forms an image indicated by the photographed image data of the camera 2 when the center of, the image indicated by the photographed image data of the camera 2 is defined as an origin are assumed to be $(x_R, y_R)$. At this time, the following formula (5) holds true.

[Formula 5]

$$|x_L - x_R| : f = B : Z_O \quad (5)$$

where f is a focus distance, and B is an optical axis distance between the two cameras. Since, under geometric conditions shown in FIGS. 8A and 8B, the camera 1 and the camera 2 are arranged parallel to the X axis, $y_L = y_R$. Since $x_L \geq x_R$ is constantly satisfied, formula (5) is changed, and thus the distance $Z_O$ between the sensor of the camera 1 or of the camera 2 and the subject can be determined by the following formula (6).

[Formula 6]

$$Z_O = \frac{B \cdot f}{x_L - x_R} \quad (6)$$

With the calculated distance $Z_O$, $(X_O, Y_O, Z_O)$ can be calculated by the following formula (7).

[Formula 7]

$$(X_O, Y_O, Z_O) = \left(\frac{Z_O}{f} \cdot x_L, \frac{Z_O}{f} \cdot y_L, \frac{B \cdot f}{x_L - x_R}\right) \quad (7)$$

As described above, according to the processing in S206, with the corresponding point information calculated in S205, it is possible to calculate the distance between the sensor of the camera at each of the pixels and the subject.

<Calculation of the Spectral Reflectance>

Here, the processing for calculating the spectral reflectance will be described in detail as the processing for calculating the second color information in S207. In S205, for each of the pixels, the calculation of the corresponding point between the images indicated by the image data is performed on data of a plurality of sheets of photographed images photographed by the camera array. Hence, although the color information on each of the pixels has only the color information on three colors in one sheet of image, information on the corresponding point of another image is used, and thus the color information has the color information on six colors. Therefore, the spectral reflectance of each of the pixels is calculated by the following formula (8) with the image data $(V_{A1}, V_{A2}, V_{A3}, V_{B1}, V_{B2}, V_{B3})$ corresponding to the six colors.

[Formula 8]

$$O = aV \quad (8)$$

where $$O = \begin{bmatrix} o_{380} \\ o_{390} \\ \vdots \\ o_{780} \end{bmatrix}$$

$$a = \begin{bmatrix} a_{380\_A1} & a_{380\_A2} & \cdots & a_{380\_B3} \\ a_{390\_A1} & a_{390\_A2} & \cdots & a_{390\_B3} \\ \vdots & \vdots & \ddots & \vdots \\ a_{780\_A1} & a_{780\_A2} & \cdots & a_{780\_B3} \end{bmatrix}$$

$$V = [V_{A1} \quad V_{A2} \quad \ldots \quad V_{B3}]$$

$O_\lambda$: reflectance of a subject at a wavelength $\lambda$ $V_i$: pixel value corresponding to the filter $i$ of a subject photographed image In formula (8), a coefficient a for the calculation of spectral data is calculated by previously photographed subjects (the number of samples: n) whose spectral reflectance $R_{sam}$ is known and using a method such as a Wiener estimation, from a correlation with a pixel value $V_{sam}$ photographed through each filter. A formula for the calculation of the coefficient using the Wiener estimation is expressed by the following formula (9).

[Formula 9]

$$a = \langle R_{sam} \cdot V_{sam} \rangle \langle V_{sam}^T \cdot V_{sam} \rangle^{-1} \quad (9)$$

where $$R_{sam} = \begin{bmatrix} R_{380\_1} & R_{380\_2} & \cdots & R_{380\_n} \\ R_{390\_1} & R_{390\_1} & \cdots & R_{390\_n} \\ \vdots & \vdots & \ddots & \vdots \\ R_{780\_1} & R_{780\_2} & \cdots & R_{780\_n} \end{bmatrix}$$

$$V_{sam} = \begin{bmatrix} V_{A1\_1} & V_{A2\_1} & B_{B3\_1} \\ V_{A1\_2} & V_{A2\_2} & V_{B3\_2} \\ \vdots & & \\ V_{A1\_n} & V_{A2\_n} & V_{B3\_n} \end{bmatrix}$$

$R_{\lambda\_j}$: reflective of the $j$-th sample at a wavelength $\lambda$ $V_{i\_j}$: pixel value corresponding to the filter $i$ of the $j$-th sample photographed image Even when the second color information is other spectral information such as a spectral radiation brightness, the second color information can be calculated by using a known method such as a method of performing calculation from a pixel value with a predetermined coefficient.

<Image Composition Processing>

Here, the image composition processing in S209 will be described in detail. In the present example, as described above, the corresponding point between the images (that is, the images indicated by the photographed image data read from the photographed image input portion 5) indicated by data of the image photographed by the camera array is calculated, and thus it is possible to calculate the distance information and the spectral information on each of the pixels. In S208, composition conditions are previously input by a user interface (hereinafter referred to as the UI) as shown in, for example, FIG. 9, and these conditions are set for the image composition condition setting portion 3. Based on those composition conditions, the image composition portion 11 uses the distance information and the spectral information, and thereby combines the images indicated by data of a plurality of sheets of photographed image read from the photographed image input portion 5 into a sheet of image.

Specifically, the geometric positions of the camera and the subject are first determined by the position of a viewpoint and the line-of-sight direction set by the image composition condition setting portion 3.

Figure 10A:
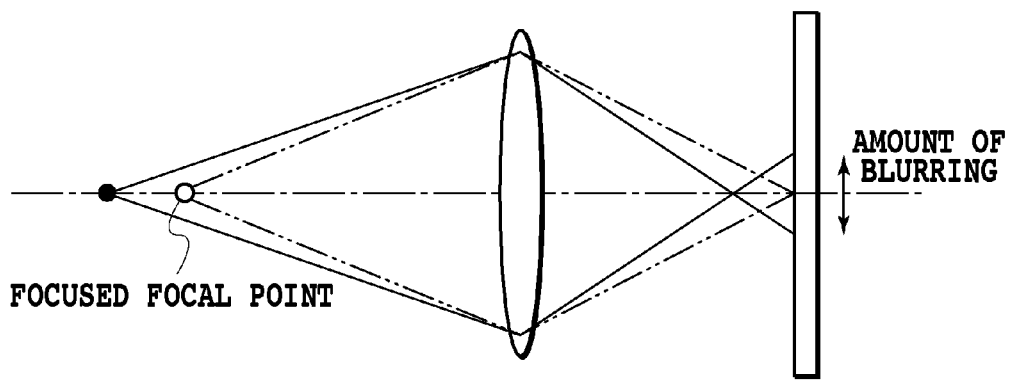
FIGS. 10A and 10B are diagrams illustrating a relationship between an aperture value and the amount of blurring.
Figure 10B:
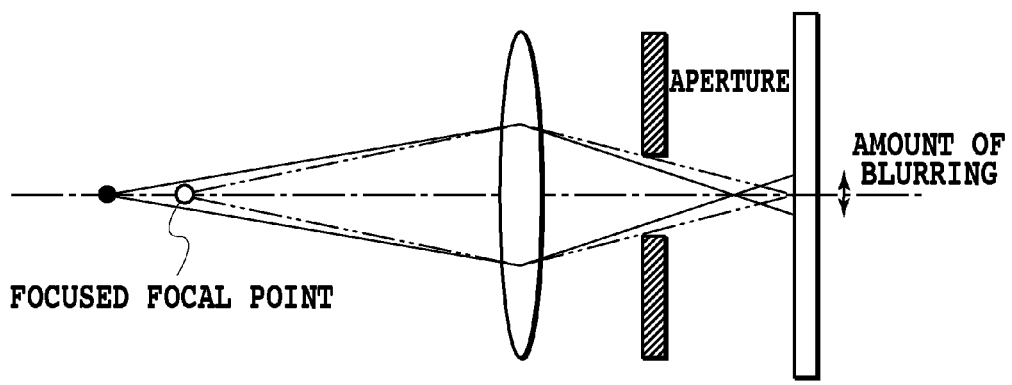

Then, as shown in FIGS. 10A and 10B, a focusing distance is determined according to a focal distance set by the image composition condition setting portion 3, and the amount of blurring of the subject in a position displaced from the focal distance is determined according to an aperture value that is set. Specifically, when the aperture value is high, as shown in FIG. 10A, the amount of blurring of a point away from the focal distance is increased whereas, as the aperture value is decreased, as shown in FIG. 10B, the amount of blurring of a point away from the focal distance is reduced. Parameters such as a filter for producing blurring are determined so that the amount of blurring corresponds to the distance information of the subject calculated in S206.

Finally, it is possible to calculate the colors of the reproduction image by multiplying the images to be combined by the spectral reflectance characteristic of the subject calculated in S207, according to illumination conditions at the time of reproduction set by the image composition condition setting portion 3. Thereafter, the composition image is generated by the filter using the determined parameters and the calculated colors of the reproduction image.

The conditions at the time of image composition are set as described above, and thus it is possible to produce the composition image corresponding to the conditions.

Any method of setting the composition conditions on the image may be used as long as necessary conditions for the image composition are sufficiently set by the user using such a method; the method is not limited to the UL shown in FIG. 9.

By performing the processing control described above, in the photographing with the camera array, it is possible to perform multi-band photographing without the resolution being reduced. It is also possible to highly accurately calculate the corresponding point between the images indicated by the image data while acquiring the spectral information on the subject from the image data obtained by the cameras having different filter set configurations.

Second Example

In the first example, a description has been given of the method of combining and outputting, as a new image, the image indicated by data of the image photographed by the camera array, by setting an arbitrary viewpoint, a line-of-sight direction, a focal distance, an aperture value, an observation light source and the like. In the second example, a description will be given of a method of calculating the distance information and the second color information from the image data photographed by the camera array and of recording them as archive image data.

Figure 11:
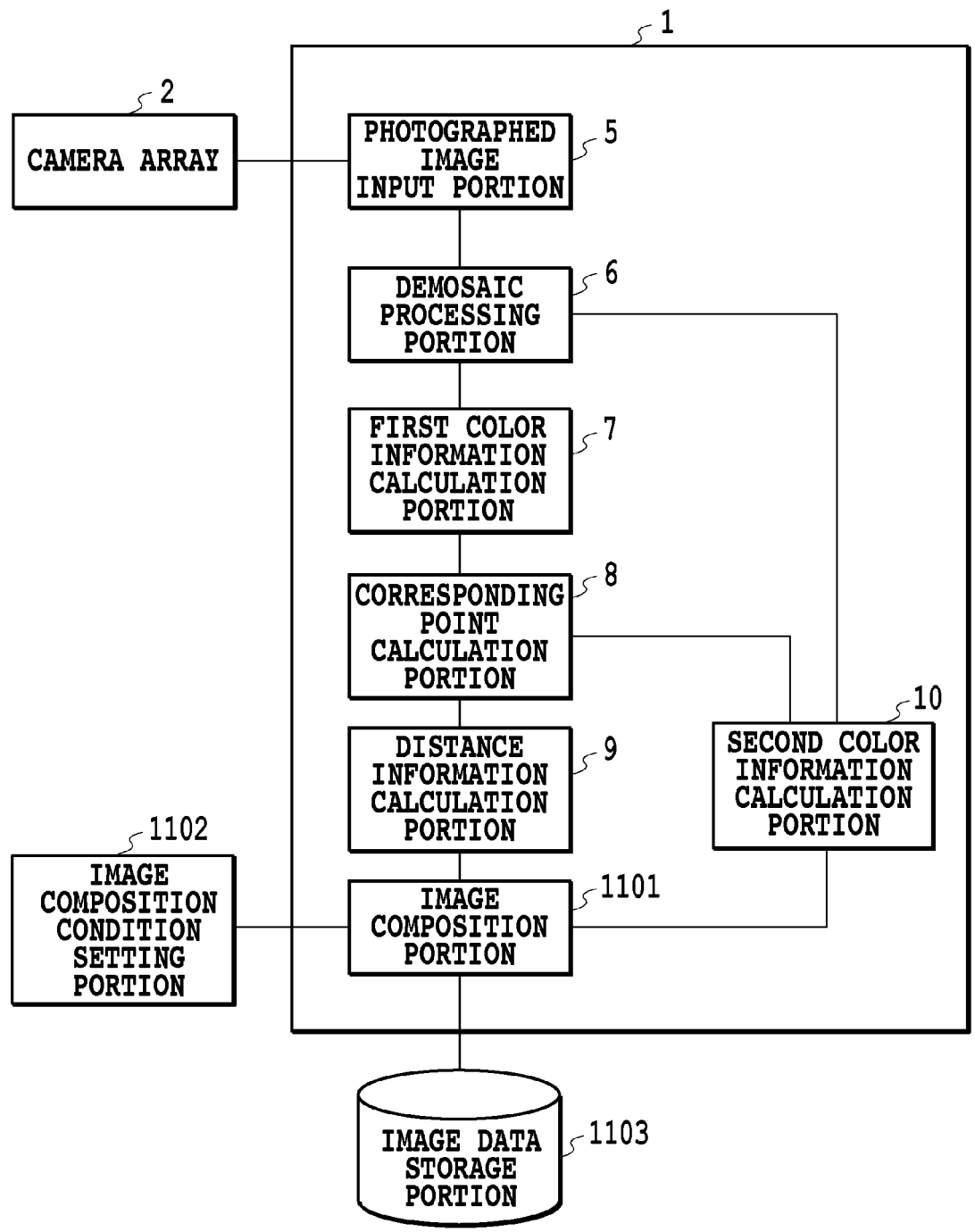
FIG. 11 is a block diagram showing the configuration of an image processing device of a second example.

The block diagram of an image processing device according to the second example is shown in FIG. 11. Since the portions ranging from the image processing device 1, the camera array 2 and the photographed image input portion 5 to the second color information calculation portion 10 are the same as in the first example, the description thereof will not be repeated.

In FIG. 11, reference numeral 1101 represents an image composition portion for combining the image data processed by the demosaic processing portion 6, the distance information calculated by the distance information calculation portion 9 and the second color information calculated by the second color information calculation portion 10. Reference numeral 1102 represents a composition condition setting portion for setting conditions when a plurality of sheets of photographed images photographed by the camera array is combined. Reference numeral 1103 represents an image data storage portion for storing the image data combined by the image composition portion 1101.

Figure 12:
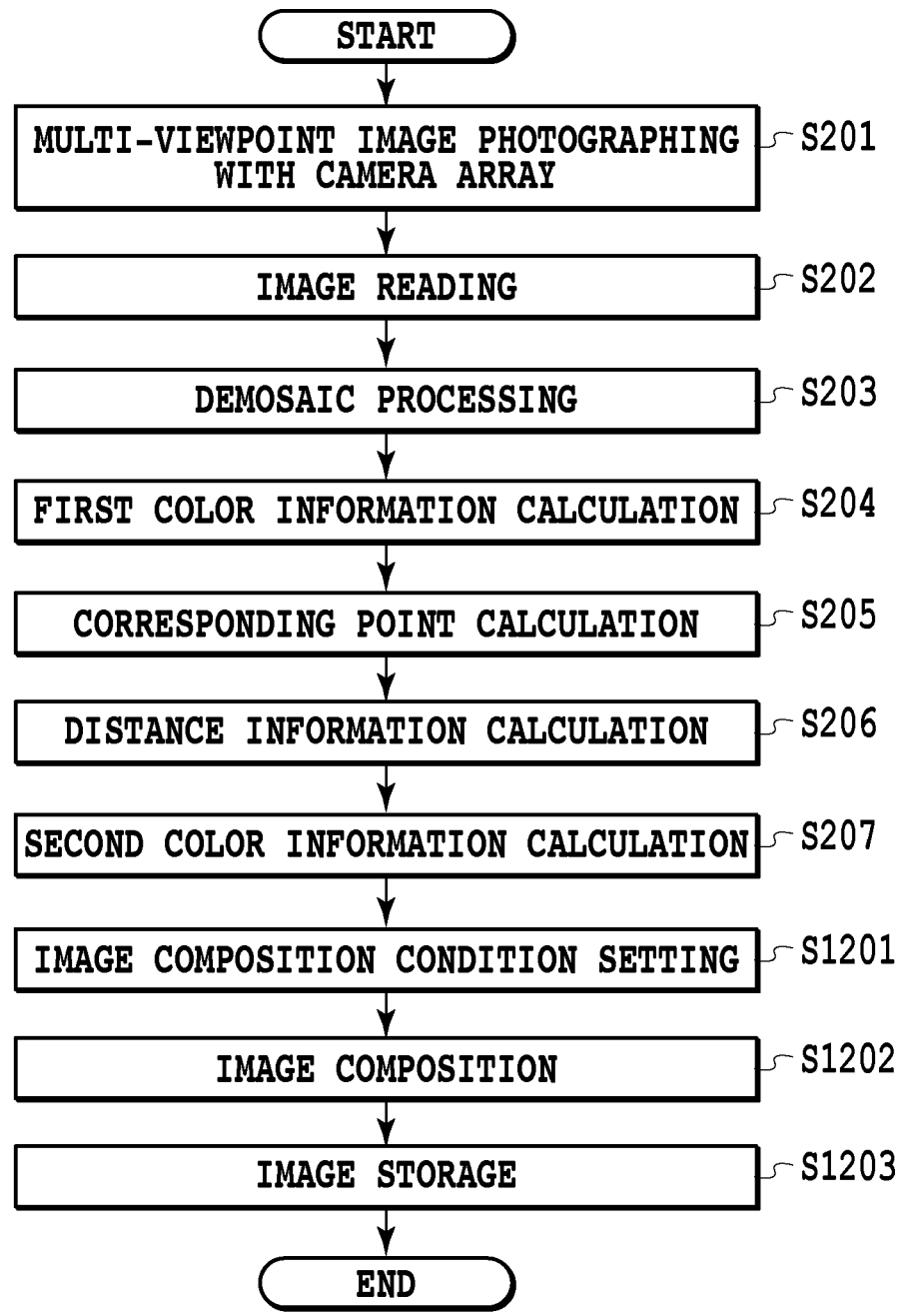
FIG. 12 is a flowchart showing processing performed by the image processing device of the second example.

FIG. 12 is a flowchart of image processing that is performed in the second example. An embodiment of the second example will be described in detail below with reference to the figure. However, since the steps from the multi-viewpoint image photographing with the camera array in S201 to the calculation of the second color information in S207 are the same as in the first example, the description thereof will not be repeated.

Figure 13:
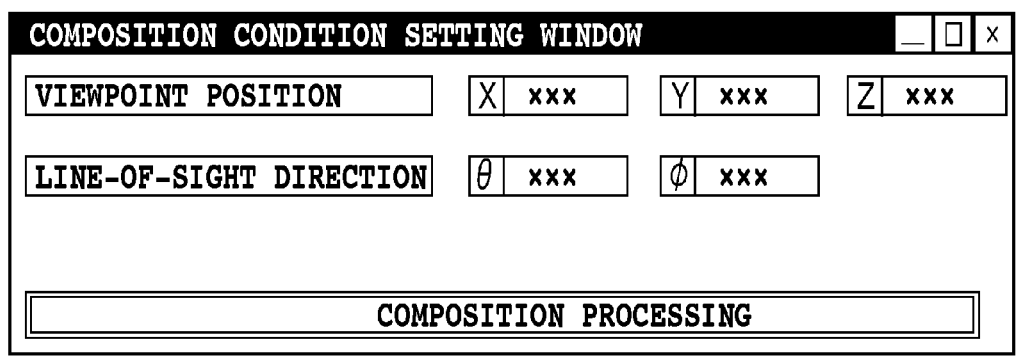
FIG. 13 is a diagram showing an example of UI for setting composition conditions in the second example.

In S1201, the image composition condition setting portion 1102 sets conditions for combining a plurality of images. FIG. 13 shows an example of the UI for setting composition conditions in the present example. Since the purpose of the present example is to store the image data as an archive image, it is unnecessary to set the conditions for the focal distance, the aperture value and the illumination light source set in the first example.

In S1202, with respect to each of the pixels of the image data, the distance information calculated in S206 and the second color information calculated in S207 are converted into information shown in, for example, FIGS. 14A and 14B. As shown in FIG. 14A, in general image data, information at a position (i, j) is only a RGB value, that is, R(i, j), G(i, j) and B(i, j). On the other hand, in the present example, in addition to such information, as shown in FIG. 14B, the distance D(i, j) of each of the pixels and the spectral reflectance $R_{380}$ (i, j) to $R_{780}$ (i, j) are combined.

In S1203, the image data obtained by the composition in S1202 is stored in the image data storage portion 1103.

By performing the processing control described above, it is possible to record the distance information on the subject and the image data having the spectral information from the image data photographed with the camera array.

Other Example

Although, in the first example and the second example described above, a description has been given of the filter configuration in which three types of color filter are used as the filter set A and three types of color filter are used as the filter set B, the present invention is not limited to this configuration. Specifically, as long as four or more types of color filter are classified into different types of filter set, and the filter set mounted in each of the cameras is configured such that the same color information can be calculated, the details thereof are not limited.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-050092, filed Mar. 8, 2011, which is hereby incorporated by reference herein in its entirety.

What is claimed is:

1. An image processing device that performs processing on a plurality of pieces of photographed image data photographed by a camera array in which cameras mounting any of two or more types of filter set are arranged in an array, the image processing device comprising:
   a first color information calculation unit configured to calculate, from pixel values of the plurality of pieces of photographed image data, first color information that is color information in a common color space;
   a distance information calculation unit configured to calculate a corresponding point between images indicated by the plurality of pieces of photographed image data by using the calculated first color information, to thereby calculate information on a depth of a subject in the image indicated by the photographed image data;
   a second color information calculation unit configured to calculate, from the pixel values of the plurality of pieces of photographed image data, second color information that is color information used for reproducing a color of the subject; and
   a combination unit configured to combine the plurality of pieces of photographed image data by using the calculated depth information and second color information,
   wherein each of the plurality of pieces of photographed image data is photographed by a camera mounting any of filter sets obtained by dividing a six-color color filter into two sets of a three-color color filter.

2. The image processing device according to claim 1, wherein the first color information is a brightness value.

3. The image processing device according to claim 1, wherein the second color information is a spectral reflectance.

4. The image processing device according to claim 1, further comprising:
   a combination condition setting unit configured to input combination conditions on the photographed images, wherein
   the combination unit performs combination based on the input combination conditions.

5. A camera array system comprising:
   a camera array in which cameras mounting any of two or more types of filter set are arranged in an array;
   a first color information calculation unit configured to calculate, from pixel values of a plurality of pieces of photographed image data photographed by the camera array, first color information that is color information in a common color space;
   a distance information calculation unit configured to calculate a corresponding point between images indicated by the plurality of pieces of photographed image data by using the calculated first color information, to thereby calculate information on a depth of a subject in the image indicated by the photographed image data;
   a second color information calculation unit configured to calculate, from the pixel values of the plurality of pieces of photographed image data, second color information that is color information used for reproducing a color of the subject; and
   a combination unit configured to combine the plurality of pieces of photographed image data by using the calculated depth information and second color information,
   wherein each of the plurality of pieces of photographed image data is photographed by a camera mounting any of filter sets obtained by dividing a six-color color filter into two sets of a three-color color filter.

6. The camera array system according to claim 5, wherein, in the camera array, cameras mounting different filter sets are alternately arranged.

7. An image processing method for performing processing on a plurality of pieces of photographed image data photographed by a camera array in which cameras mounting any of two or more types of filter set are arranged in an array, the image processing method comprising:
   a first color information calculation step of calculating, from pixel values of the plurality of pieces of photographed image data, first color information that is color information in a common color space;
   a distance information calculation step of calculating a corresponding point between images indicated by the plurality of pieces of photographed image data by using the calculated first color information, to thereby calculate information on a depth of a subject indicated by the photographed image data;
   a second color information calculation step of calculating, from the pixel values of the plurality of pieces of photographed image data, second color information that is color information used for reproducing a color of the subject; and
   a combination step of combining the plurality of photographed images by using the calculated depth information and second color information,
   wherein each of the plurality of pieces of photographed image data is photographed by a camera mounting any of filter sets obtained by dividing a six-color color filter into two sets of a three-color color filter.

8. A non-transitory computer-readable recording medium having computer-executable instructions for performing an image processing method for causing a computer to perform processing on a plurality of pieces of photographed image data photographed by a camera array in which cameras mounting any of two or more types of filter set are arranged in an array, the method comprising:
   a first color information calculation step of calculating, from pixel values of the plurality of pieces of photographed image data, first color information that is color information in a common color space;

a distance information calculation step of calculating a corresponding point between images indicated by the plurality of pieces of photographed image data by using the calculated first color information, to thereby calculate information on a depth of a subject indicated by the photographed image data;

a second color information calculation step of calculating, from the pixel values of the plurality of pieces of photographed image data, second color information that is color information used for reproducing a color of the subject; and a combination step of combining the plurality of photographed images by using the calculated depth information and second color information, wherein each of the plurality of pieces of photographed image data is photographed by a camera mounting any of filter sets obtained by dividing a six-color color filter into two sets of a three-color color filter.

* * * * *